Oct. 5, 1965 W. B. KLEES ETAL 3,210,478

COMMUNICATION SWITCHING SYSTEM AND OUTLET TESTING CIRCUIT ARRANGEMENT THEREFOR

Filed Jan. 29, 1963 2 Sheets-Sheet 1

INVENTORS
William B. Klees
William C. Miller
BY Emiel H.M. Sellenslagh
C. A. Gulbrandsen
ATTY.

Oct. 5, 1965 W. B. KLEES ETAL 3,210,478

COMMUNICATION SWITCHING SYSTEM AND OUTLET TESTING CIRCUIT ARRANGEMENT THEREFOR

Filed Jan. 29, 1963 2 Sheets-Sheet 2

INVENTORS
William B. Klees
William C. Miller
Emiel H. M. Sellenslagh

BY C. A. Gulbrandsen
ATTY.

United States Patent Office 3,210,478
Patented Oct. 5, 1965

3,210,478

COMMUNICATION SWITCHING SYSTEM AND OUTLET TESTING CIRCUIT ARRANGEMENT THEREFOR

William B. Klees, Chicago, and William C. Miller, Glen Ellyn, Ill., and Emiel H. M. Sellenslagh, Aartselaar, Belgium, assignors to Automatic Electric Laboratories, Inc., Northlake, Ill., a corporation of Delaware Filed Jan. 29, 1963, Ser. No. 254,750
9 Claims. (Cl. 179—18)

Figure 1:
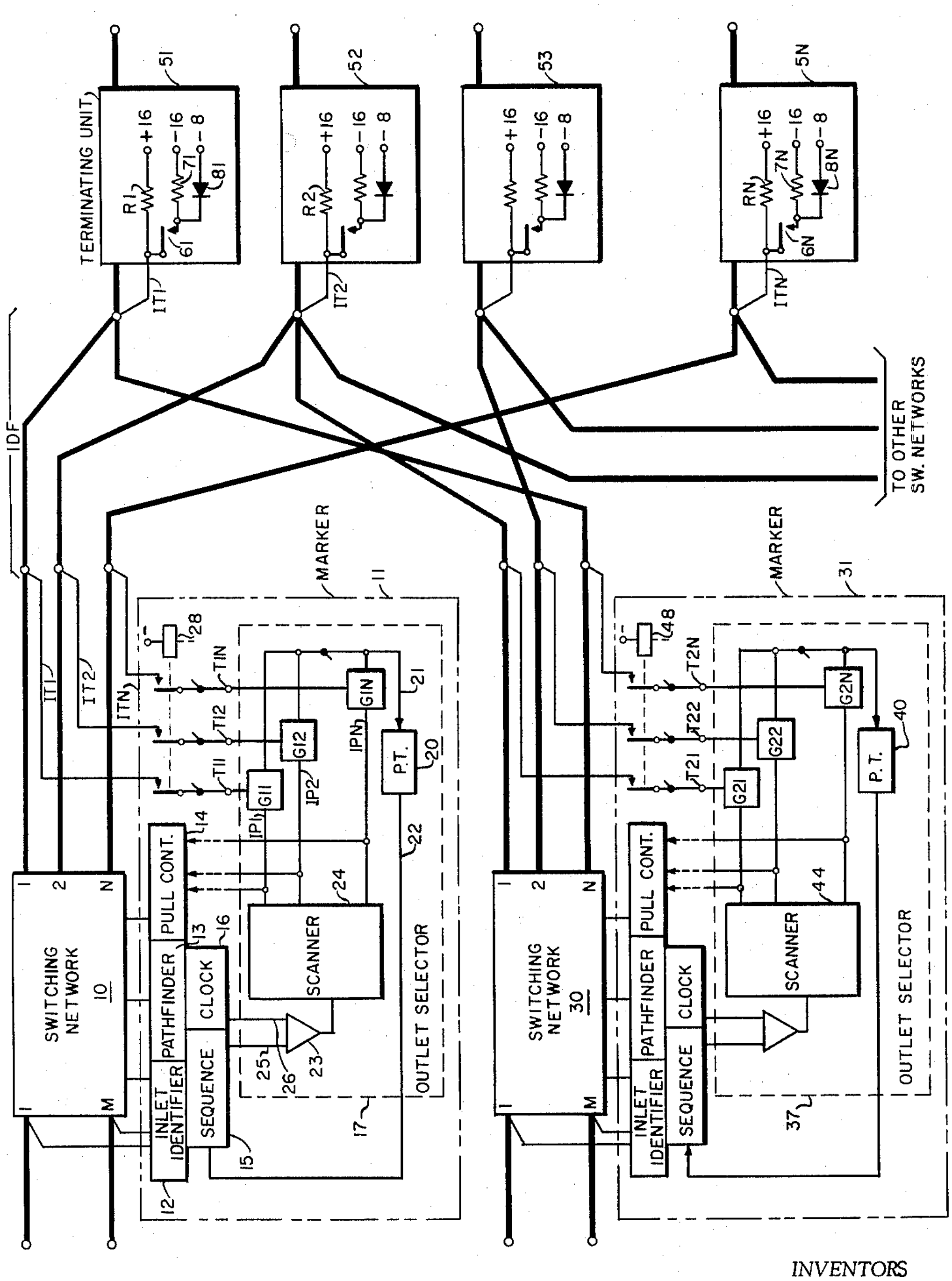

This invention relates to a communication switching system and an outlet testing circuit arrangement therefor, and more particularly to an arrangement which permits several selecting units having connections in multiple to the same outlets to test for the availability of the outlets.

A typical communication switching system in which the invention may be incorporated is disclosed in the copending U.S. patent applications Serial No. 230,887 filed October 16, 1962, now Patent No. 3,170,041 by K. K. Spellnes and Serial No. 240,497 filed November 28, 1962, by K. K. Spellnes, M. H. Esperseth, and W. R. Wedmore. In that system switching networks are controlled by markers. In a line group stage calling lines in different line groups have access through respective switching networks to a common group of registers; and in a selector stage calls in different selector groups have access to a common group of outlets in various levels to local terminating call equipment or outgoing trunks to other exchanges. In either case several calls may be processed simultaneously by different markers (each marker handling one call at a time).

The object of this invention is to provide a simple, effective circuit arrangement for finding an idle outlet, which is fast and compatable with an electronic system, which positively prevents double connections if two calls test the same outlet at the same time, and which does not require any allotters or other arrangements for coordinating the action of different markers testing the same group of outlets.

According to the invention the terminating unit associated with each outlet includes an idle test resistor, and each marker includes an idle testing circuit arrangement comprising a bistable trigger circuit and electronic gate circuits for individually connecting the idle test conductors from the test resistor to the trigger circuit one at a time; there being a transistor in the trigger circuit which, in response to the outlet being idle, conducts and switches the trigger circuit to a conducting state.

An important feature of the invention relates to the fact that if two of these bistable trigger circuits in different markers are connected through respective gate circuits to the same idle test resistor in a terminating unit, only one of the trigger circuits can switch to the fully conducting state, positively prevents any other trigger circuit from completing such switching action, and causes any trigger circuit which has started to conduct to revert to the non-conducting state.

The bistable trigger circuit may comprise a pair of complementary transistors of opposite conductivity type, with the base of each connected to the collector circuit of the other. The first transistor has its emitter electrode connected in multiple to the emitter electrodes of transistors of the opposite conductivity type in the individual gate circuits, and each of these transistors in the gate circuits has its collector electrode connected to its corresponding idle test lead. The other transistor of the trigger circuit has a diode connected between the emitter and base electrodes and oppositely poled with respect to the emitter-base junction, this diode being normally forward biased thereby to maintain the transistor in the cutoff condition. A scanner supplies enabling pulses to control leads of the gate circuits one at a time, and whenever a gate is enabled, if its idle test lead is connected to an idle test resistor and the outlet is idle, the gate transistor conducts in series with the first transistor in the trigger circuit. Then current rapidly builds up until it reaches a value sufficient to reverse bias the diode and thereby forward bias the second transistor into conduction, and each of the two transistors drives the other into full conduction. The current drawn by the trigger circuit from the idle test resistor associated with the outlet prevents any other trigger circuit in other markers which happen to test this outlet from switching into a conducting state.

Figure 2:
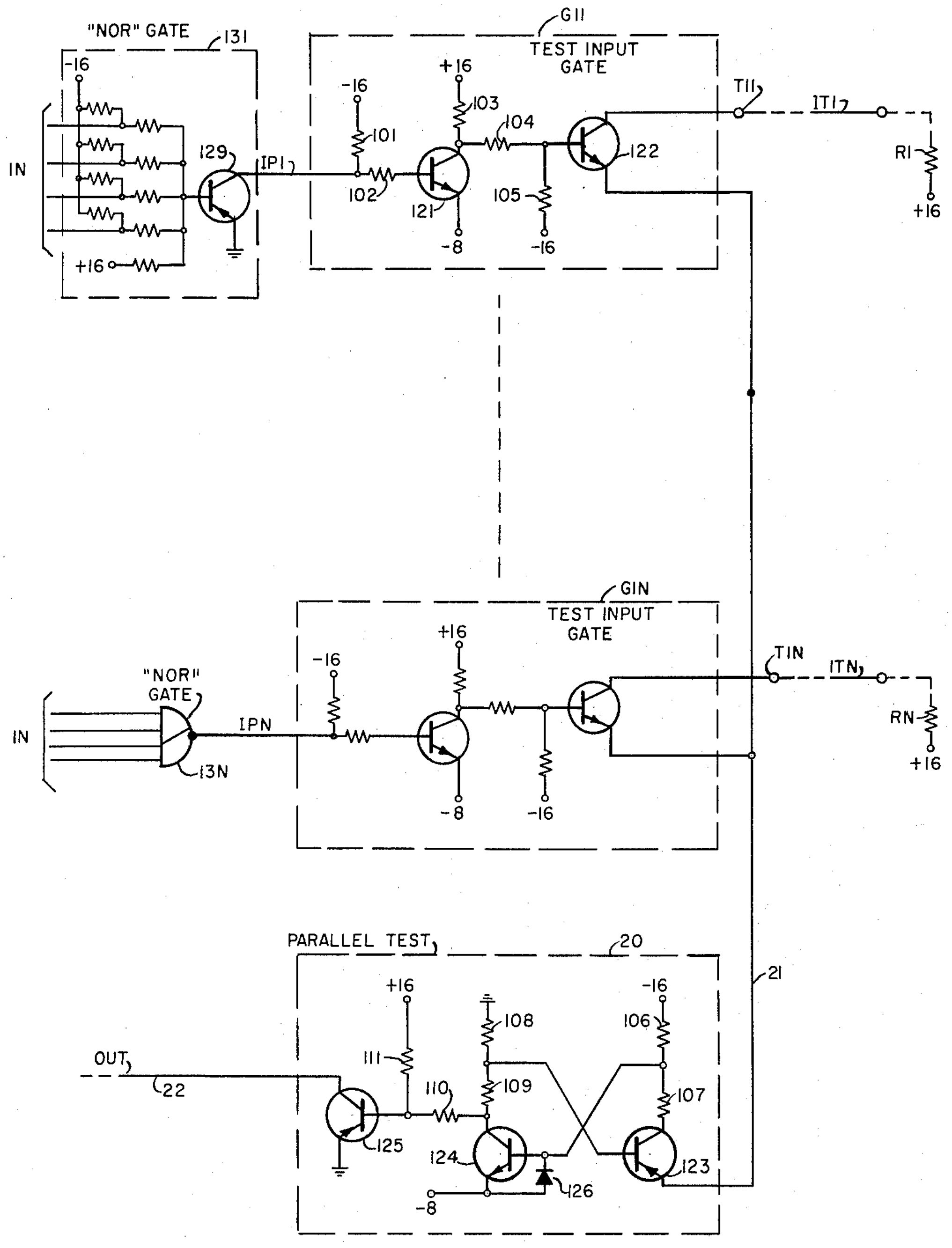

The above-mentioned and other objects and features of this invention and the manner of attaining them will become more apparent, and the invention itself will be best understood, by reference to the following description of an embodiment of the invention taken in conjunction with the accompanying drawings comprising FIGS. 1 and 2 wherein:

FIG. 1 is a block diagram of part of a telephone switching exchange, showing parallel test circuits in different markers having access to the same group of outlets and their associated terminating units; and FIG. 2 is a schematic diagram showing a parallel test trigger circuit and the associated test input gates with idle test conductors to respective idle test resistors.

The portion of a switching system in FIG. 1 shows two switching networks 10 and 30, each of which is used to establish selectively connections between inlets 1 to M and outlets 1 to N. Intra-office trunks from the outlets extend by way of an intermediate distributing frame IDF to terminating units 51 to 5N. Some type of grading arrangement will usually be used on the IDF frame, so that each of the terminating units 51 to 5N is reached by trunks from several different switching networks. Each of the intra-office trunks includes conductors for communication and control and also includes an idle test conductor such as conductors IT1 to ITN in the respective trunks from the outlets of switching network 10. In the terminating units these idle test conductors are connected to idle test resistors R1 to RN respectively.

Connections through the switching networks are established under the control of markers. For example a marker 11 may be associated with network 10 and a marker 31 with network 30. With fast electronic control circuits a single marker may serve several switching networks, in which case the marker would be connected through switching devices to the network under the control of an allotter.

To explain the operation of establishing a connection, assume that a service request signal is received over one of the incoming lines to one of the inlets 1 to M of the switching network 10. This call signal is repeated to the inlet identifier 12 of marker 11. Subsequently during the marker cycle, relay 28 operates and at its contacts connects the idle test leads IT1 to ITN to the test terminals T11 to T1N. Under the control of sequence circuit 15, pulses from clock 16 are gated through a gated pulse amplifier 23 to drive a scanner 24 in outlet selector 17, to thereby enable one at a time the test input gates G11 to G1N. This connects the parallel test circuit 20 to the test leads one at a time. When a terminal is reached which tests idle, the parallel test circuit 20 switches to a conducting state and transmits a signal over lead 22 to sequence circuits 15, which then changes the signal on lead 25 to block gated pulse amplifier 23 and thereby stop the scanner 24. If another parallel test circuit such as circuit 40 in marker 31 is connected to the same test resistor of the terminating unit at the same time, only one of the parallel test units can switch, which then draws sufficient current through the test resistor in the terminating unit to prevent any other parallel test circuit from switching.

The pathfinder 13 of marker 11 then receives the inlet identity from inlet identifier 12 and the outlet identity from scanner 24 and proceeds to test the links in the switching network 10 to find an available path. Then, under control of signals supplied through the inlet identifier to the inlet side of the network and through a pull control circuit 14 to the outlet side, the connection is established. In the terminating unit, which may for example be unit 51, a relay (winding not shown) operates its contacts 61 to connect a circuit, comprising resistor 71 and diode 81 respectively from the −16 and −8 volt power sources to the idle test lead IT1, which marks the unit busy. The marker 11 is released to serve other calls.

For examples of use of this arrangement and a more complete description of the switching system reference may be made to said copending applications of Spellnes and of Spellnes et al. In that system there are three main types of switching groups, e.g. line groups, incoming trunk groups, and group selectors.

Each line group serves 1,000 local subscriber lines providing access to 24 registers and to 120 intra-office originating trunks. In this case in each switching network $M$=1,000 and $N$=24. The oulet from the switching network to the originating trunks are not shown herein in FIG. 1. The terminating units 51 to 5N represent register junctors providing access to the registers.

In an incoming trunk group, the switching network provides access from 75 incoming trunks to 16 register junctors, in which case $M$=75 and $N$=16.

Each group selector has 300 inlets and up to 1,200 outlets. However the outlets are divided into a number of levels of from 10 to 60 outlets each and the outlet terminals shown for the switching networks in FIG. 1 represent only one level so that for example N may equal 60. At the inlet side M is equal to 300. In the groups selector marker there is also a level selector which receives signals from the inlet terminal and then selectively causes relay 28 to operate to connect the 60 terminals T11 to T1N ($N$=60) or part of them if the level is less than 60 outlets to some or all of the idle test leads IT1 to ITN, or by way of contacts of other relays (not shown) from the multiple to similar idle test leads corresponding to other outlets (not shown) from the switching network. The terminating units 51 to 5N may be outgoing trunks or terminating junctors of local line groups.

Referring to FIG. 2, the parallel test circuit 20 comprises a P–N–P transistor 123 and an N–P–N transistor 124 in a direct coupled bistable trigger circuit. The base electrode of transistor 123 is directly connected to the junction between resistors 108 and 109 which are connected between the collector electrode of transistor 124 and ground potential. The base electrode of transistor 124 is connected to the junction point of the resistors 106 and 107 between the collector electrode of transistor 123 and a negative 16-volt source. A diode 126 is connected between the emitter and base electrodes of transistor 124 and reverse poled with respect to the emitter-base junction, and the emitter electrode is connected to a negative 8-volt source. In the normal "off" condition diode 126 and resistor 106 reverse bias transistor 124.

The emitter electrode of transistor 123 is connected via conductor 21 in multiple to the emitter electrodes of transistors in the input gate circuits G11 to G1N. For example in gate G11 this conductor is connected to the emitter electrode of a transistor 122. Transistor 122 is controlled by a connection from its base electrode through a resistor 104 to the collector electrode of a transistor 121, with a connection of the base electrode of transistor 122 through a resistor 105 to the negative 16-volt source, and a connection from the collector electrode of transistor 121 through a resistor 103 to the positive 16-volt source. The emitter electrode of transistor 121 is connected to the negative 8-volt source, and its base electrode is connected through a resistor 102 via input lead IP1 to the collector electrode of a transistor 129 of a NOR gate 131, and the lead IP1 is also connected through a resistor 101 to the negative 16-volt source. The other gates such as gate G1N are similar, and are similarly controller by NOR gates, the NOR gate 140 connected to lead IPN being shown symbolically. These NOR gates 131 to 13N form part of an output decoding circuit of scanner 24 (FIG. 1).

Normally transistor 129 is conducting, which places the lead IP1 at near ground potential and drives transistor 121 into conduction. The collector electrode of transistor 121 is then near negative 8 volts, and the gate transistor 122 is reverse biased and maintained cut off. As long as all of the gates G11 to G1N are off, the transistor 123 of parallel test circuit 20 is maintained cut off. Thus both transistors 123 and 124 are nonconducting and the parallel test circuit 20 is in an off state. The bias connections for transistor 122 insure that any leakage current is drained off, so that the transistor 122 remains cut off.

Assume now that terminal T11 of gate G11 is connected via the idle test lead IT1 to the test resistor R1, which is connected to the positive 16-volt source; and that the scanner causes transistor 129 of NOR gate 131 to be driven to cutoff. Then transistor 121 is cut off and a positive potential is applied to the base electrode of transistor 122. A path to the emitter electrode of transistor 122, and thence through the emitter-base junction of transistor 123 and resistor 108 to ground forward biases the transistors 122 and 123. If no other parallel test circuit is connected via one of its test input gates to resistor R1, current will now flow from the positive 16-volt source through resistor R1, transistor 122, transistor 123, resistor 107, and resistor 106 to the negative 16-volt source. When the collector current of transistor 123 reaches a sufficient value, the potential at the junction of transistors 106 and 107 reverse biases the diode 126, and the emitter-base junction of transistor 124 is forward biased to start transistor 124 conducting. The collector current of transistor 124 makes the junction of resistors 108 and 109 more negative and increases the forward bias of transistor 123; thus both of the transistors 123 and 124 are both rapidly driven into full conduction. Output is taken from the collector electrode of transistor 124 through resistor 110 to switch the output transistor 125 into conduction, placing the collector electrode and output conductor 22 near ground potential.

Consider now the situation in which the two markers 11 and 31 are connected to the idle test leads, and simultaneously the scanner 24 of marker 11 enables gate G11 and the scanner 44 of marker 31 enables gate G2N, so that both of the parallel test circuits 20 and 40 are connected to the idle test resistor R1. Then current starts to conduct through transistors 122 and 123 in series, and at the same time through corresponding transistors in gates G2N and parallel test circuit 40. Because of differences in the transient characteristics and conditions, one of the parallel test circuits will switch into full conduction, and this causes the other parallel test circuit to revert to the cutoff state. Thus the unique selection between two or more simultaneous tests is established.

In an exemplary embodiment of the invention the test resistors R1 to RN each have a value of 910 ohms and a power rating of two watts. The tolerance of these resistors and all the resistors in the gates and parallel test circuits is ±5%. The component types and values are given in the following table using the reference characters shown for gate G11 and the parallel test circuit 20.

*Transistors*

| | |
|---|---|
| 121 | 2N1605 |
| 122 | 2N1605A |
| 123 | 2N404 |
| 124 | 2N1605 |
| 125 | 2N404 |

*Diodes*

| | |
|---|---|
| 126 | Sylvania D1034 |

*Resistors*

| | Ohms |
|---|---|
| 101 | 10,000 |
| 102 | 7,500 |
| 103 | 2,000 |
| 104 | 1,500 |
| 105 | 12,000 |
| 106 | 750 |
| 107 | 51 |
| 108 | 2,400 |
| 109 | 100 |
| 110 | 3,000 |
| 111 | 33,000 |

It has been found that with values for the test resistors R1 to RN as low as 100 ohms, good switching operation is obtained, and that in simultaneous tests there is never more than one of the parallel test circuits which remains conducting. The trigger circuit has rapid switching characteristics because of the complementary arrangement of the transistors 123 and 124, in which each transistor drives the other into full conduction. The parallel test circuit is capable of reliable operation over a wide range of temperature and voltage. However the direct-current sources are preferably rated with a tolerance of $\pm 5\%$. The parallel test trigger circuit has a high efficiency in power drain because in the normal off condition both transistors are cut off. A theoretically unlimited number of stages may be paralleled because no bias current is required from the "on" parallel test circuit to maintain the remaining parallel test circuits cut off. In practice as many as ten parallel test circuits in separate markers are provided with access to a common terminating unit, and within the marker each parallel test circuit is provided with as many as sixty input gate circuits.

Operation can be accomplished with either direct current levels at the inputs IP1 to IPN of the test input gates, or pulse frequencies may be used up to as high as 125 kilocycles.

While we have described above the principles of our invention in connection with specific apparatus, it is to be clearly understood that this description is made only by way of example and not as a limitation to the scope of our invention.

What is claimed is:

1. In a communication switching system, a plurality of switching networks each having a plurality of outlets;

a plurality of terminating units each having an inlet connected in multiple via trunks to an outlet of each of a plurality of said switching networks, an idle test impedance device in each terminating unit connected to an idle test conductor of each trunk which is connected to the inlet of the terminating unit;

there being associated with the switching networks a plurality of markers, each of which includes an outlet selector having a plurality of test terminals, a plurality of transistor gates individually connected thereto, and a bistable transistor trigger circuit having a common connection to all of said gates of the outlet selector;

means for connecting the test terminals of an outlet selector to the idle test leads of a group of outlets of a switching network, and means for then supplying enabling pulses to one at a time of the gates of the outlet selector;

means in each said trigger circuit responsive to the enabling of a gate connected thereto and to the idle test device of a terminating unit which is idle for initiating the switching to an "on" state of the trigger circuit, thereby drawing current through said idle test device, and for permitting only one trigger circuit connected via an enabled gate to the last said idle test device to fully switch to the "on" state, causing any other such trigger circuit simultaneously connected to the same device to revert or remain in the "off" state.

2. In a communication switching system, the combination as claimed in claim 1, wherein said means for supplying enabling pulses comprises a scanner in each outlet selector, and where each marker includes means responsive to its trigger circuit switching fully to the "on" state to stop the scanner and thereby provide an indication of the selected outlet.

3. In a communication switching system, the combination as claimed in claim 1, wherein each said terminating unit includes means for applying busy indicating condition to the idle test conductors of trunks connected to its inlet, independently of the markers, said busy indicating condition being effective to prevent switching to the "on" state of any trigger circuit testing that unit, whereby a marker which has successfully tested and seized a terminating unit may be released after the connection has been established in the switching network.

4. In a communication switching system, a plurality of outlet selectors, a common outlet test resistor and means for connecting it in multiple to a test terminal of each of said outlet selectors;

each of said outlet selectors comprising a bistable trigger circuit including first and second transistors, and an input gate circuit including a third transistor, each of said transistors having emitter, base and collector electrodes, the first transistor being of a first conductivity type and the second and third transistors being of a second conductivity type;

the first and second transistors each having the base electrode directly connected to a point in a resistance network in the collector circuit of the other, and connections placing the emitter-collector path of the third transistor between the emitter electrode of the first transistor and said test terminal to the common idle test resistor, direct-current bias means normally biasing all three of said transistors to cutoff;

means responsive to an input control signal to the base electrode of the third transistor and said test terminal being connected to said common test resistor of an associated idle outlet tending to drive the third and first transistors into conduction, and means in said trigger circuit under the condition that no other selector circuit is similarly testing said outlet for switching the first and second transistors into full conduction, thereby drawing current through said test resistor which prevents the trigger circuit of any other outlet selector which subsequently tests said outlet from switching into conduction;

said means being operative under the condition in which more than one selector circuit simultaneously tests the same said outlet to cause the trigger circuit of one output selector to switch into full conduction and thereby cause any other trigger circuit which has started to conduct to revert to the nonconducting state.

5. In a communication switching system, the combination as claimed in claim 4, wherein the trigger circuit of each output selector circuit includes a diode connected between the emitter and base electrodes of the second transistor and reverse poled with respect to the emitter-base junction of that transistor to maintain that transistor cut off until the collector current of the first transistor reaches a given value, and then to cause the second transistor to rapidly switch into conduction upon a further increase of the collector current of the first transistor.

6. In a communication switching system, the combination as claimed in claim 5, wherein the said input gate circuit of each output selector includes a fourth transistor of the second conductivity type having emitter, base and collector electrodes, with its collector electrode connected through a resistor to the base electrode of the third transistor, and a connection from its base electrode to an input control circuit, direct-current bias means normally biasing the fourth transistor into full conduction and thereby supplying cutoff bias to the third transistor, and means responsive to an input control signal for driving the fourth transistor into cutoff and thereby causing forward biasing potential to be supplied to the emitter-base junction of the third transistor;

and a connection from the base electrode of the third transistor to a direct-current bias potential which in the normal condition with the fourth transistor fully conducting aids in maintaining the third transistor biased to cutoff and prevents leakage current from causing an accumulation of bias potential which might cause conduction in the third transistor.

7. In a communication switching system, the combination as claimed in claim 6, wherein said third transistor has its emitter electrode connected to the emitter electrode of the first transistor, and its collector electrode connected to said test terminal.

8. In a communication switching system, the combination as claimed in claim 7, wherein each of said output selectors includes a plurality of said input gate circuits and associated test terminals, the collector electrode of the third transistor of each gate circuit being connected to its associated test terminal, and the emitter electrodes of the third transistors of all of the input gates being connected in common to the emitter electrode of the first transistor.

9. In a communication switching system, the combination as claimed in claim 8, further including scanning means associated with each output selector and means for causing it to supply enabling pulses to the base electrodes of the fourth transistors of the input gate circuits in turn, and means responsive to the testing of an idle outlet and the switching of the first and second transistors in the bistable trigger circuit for stopping the scanner, to thereby supply an output indication of the selected outlet.

No references cited.

ROBERT H. ROSE, *Primary Examiner.*